(12) United States Patent
Sakamoto et al.

(10) Patent No.: US 12,192,783 B2
(45) Date of Patent: Jan. 7, 2025

(54) STATION PLACEMENT DESIGNING ASSISTANCE APPARATUS, STATION PLACEMENT DESIGNING ASSISTANCE METHOD AND PROGRAM

(71) Applicant: NIPPON TELEGRAPH AND TELEPHONE CORPORATION, Tokyo (JP)

(72) Inventors: Kazumitsu Sakamoto, Musashino (JP); Kenji Suzuki, Musashino (JP); Yohei Katayama, Musashino (JP); Yosuke Fujino, Musashino (JP); Hiroyuki Fukumoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 400 days.

(21) Appl. No.: 17/596,404

(22) PCT Filed: Jun. 13, 2019

(86) PCT No.: PCT/JP2019/023541
§ 371 (c)(1),
(2) Date: Dec. 9, 2021

(87) PCT Pub. No.: WO2020/250392
PCT Pub. Date: Dec. 17, 2020

(65) Prior Publication Data
US 2022/0240101 A1 Jul. 28, 2022

(51) Int. Cl.
*H04W 16/18* (2009.01)
*H04W 24/02* (2009.01)

(52) U.S. Cl.
CPC .......... *H04W 16/18* (2013.01); *H04W 24/02* (2013.01)

(58) Field of Classification Search
CPC ........ H04W 24/02; H04W 16/18; H04W 4/38
See application file for complete search history.

(56) References Cited

U.S. PATENT DOCUMENTS

2017/0347335 A1* 11/2017 Yi ............................ H04W 4/38
2018/0295612 A1* 10/2018 Yi ....................... H04W 52/0216
(Continued)

FOREIGN PATENT DOCUMENTS

EP         3675547 A1 *  7/2020  ............ H04W 16/18
JP    2001285923 A    10/2001
(Continued)

*Primary Examiner* — Syed Ali
(74) *Attorney, Agent, or Firm* — Harness, Dickey & Pierce, P.L.C.

(57) ABSTRACT

A station installation designing assistance device that divides a service providing area into a plurality of areas, and performs station installation designing for the plurality of areas in parallel, the station installation designing assistance device including: an area dividing unit that divides an entirety of the service providing area into a plurality of areas that are each composed of a predetermined number of small areas; a small area specifying unit that specifies a small area number that identifies a small area in each of the areas, where the same number is given to the small area in each of the areas; and a station installation location selecting unit that selects, for each of the plurality of areas, a plurality of station installation locations from among station installation location candidates that are present in the small area specified by the small area specifying unit.

4 Claims, 4 Drawing Sheets

(56) References Cited

U.S. PATENT DOCUMENTS

| 2020/0076013 | A1* | 3/2020 | Sato | H01M 10/48 |
| 2020/0221270 | A1* | 7/2020 | Ikkaku | H04L 67/06 |
| 2021/0410226 | A1* | 12/2021 | Gagnon | G16Y 40/10 |

FOREIGN PATENT DOCUMENTS

| JP | 2009267925 A | 11/2009 |
| JP | 5538286 B2 | 7/2014 |
| JP | 2015109596 A | 6/2015 |
| JP | 2016213629 A | 12/2016 |

* cited by examiner

Fig. 4

STATION PLACEMENT DESIGNING ASSISTANCE APPARATUS, STATION PLACEMENT DESIGNING ASSISTANCE METHOD AND PROGRAM

CROSS-REFERENCE TO RELATED APPLICATIONS

This application is a 371 U.S. National Phase of International Application No. PCT/JP2019/023541 filed on Jun. 13, 2019. The entire disclosures of the above application is incorporated herein by reference.

TECHNICAL FIELD

The present invention relates to a station installation assisting designing device, a station installation assisting designing method, and a program.

BACKGROUND ART

With the development of IoT (Internet of Things) technology, it has increasingly become common that things that are equipped with various sensors and communication functions (hereinafter referred to as "IoT devices" or "terminals") are connected to networks, and remote data collection and remote control or the like of IoT devices are performed. Also, in recent years, LPWA (Low Power Wide Area network) has been attracting attention as a wireless communication method for IoT devices. Examples of LPWA include wireless communication methods such as LoRaWAN and Sigfox, which employ an unlicensed band (a frequency band that does not require a radio station license), and LTE-M (Long Term Evolution for Machines) and NB (Narrow Band)-IoT, which employ a license band (a frequency band that requires a radio station license).

It is common that IoT devices are fixedly installed and used mainly in specific locations. On the other hand, radio wave propagation is highly location-dependent. Therefore, if an IoT device is installed in a dead zone where the received power of radio waves from a base station is low, communication may become unavailable for a long period of time. Therefore, it is important to design station installation so that sufficient received power can be ensured in the location where an IoT device is planned to be installed.

In addition, when the number of terminals accommodated in a base station is too large, or when radio wave interference is frequently caused by an interference source such as a nearby base station, it may be impossible to ensure sufficient communication quality even if an IoT device is newly installed. In such a case, a communication failure frequently occurs. Therefore, in addition to evaluating the received power in the planned installation location as described above, it is important to take into consideration the usage status of the radio resources of a base station and the occurrence status of radio wave interference in the vicinity of the base station, to determine, in advance, whether or not a new IoT device can be accommodated. In order to perform such a determination, a means for estimating the success rate of communication is required.

With a wireless communication system in which terminals are fixedly installed, it is possible to estimate the success rate of communication for each terminal, based on information regarding, for example, a desired wave reception power, an interference signal power, a traffic pattern, and thermal noise power in the base station and the terminal, calculated from information indicating the installation location of the base station and the installation location of the terminal. Note that the aforementioned traffic pattern includes, for example, the frequency of uplink communications from the terminal to the base station, a communication time of each uplink communication, a communication time of an ACK (Acknowledge) signal from the base station to the terminal, and so on.

Conventionally, techniques have been disclosed for designing station installation so as to satisfy both a constraint condition such as a condition that a capacity that meets the demand for communication traffic is secured, for example, and an optimization condition such as a condition that the entire service providing area is covered by a minimum number of base stations, for example (for example, see PTL 1 and PTL 2).

Conventional station installation designing techniques as disclosed in PTL 1, PTL 2, and so on are most effective when station installation designing is performed for the entire service providing area all at once. However, with such conventional techniques, it is necessary to perform calculation for station installation designing after importing a large amount of data such as 3D (three-dimensional) map data, data indicating candidate sites for station installation, and data regarding existing base stations, for the entire service providing area, which is typically a vast area. Therefore, a huge number of computational resources are required.

Note that 3D map data includes information regarding the altitude of each point, the height of the building, and a land use classification, for example. Data regarding the existing base stations also includes data regarding base stations that are planned to be installed in the station installation locations selected through station installation designing, for example.

As described above, a huge number of computing resources are required when station installation designing is performed for the entire service providing area all at once. Therefore, in general, the entire service providing area may be divided into a plurality of areas, and station installation designing may be performed individually for each of the plurality of divisional areas. In such a case, in order to improve processing efficiency, station installation designing may be performed in parallel for the plurality of divisional areas.

Note that, in general, in order to ensure the accuracy of station installation designing at the ends of the divisional areas, station installation designing is performed after importing various kinds of data regarding a region that has been expanded (in the north, south, east, and west, for example) so as to include the area that is the subject of station installation designing.

CITATION LIST

Patent Literature

[PTL 1] Japanese Patent Application Publication No. 2001-285923
[PTL 2] Japanese Patent No. 5538286

SUMMARY OF THE INVENTION

Technical Problem

As a result of the entire service providing area being divided into a plurality of areas in this way, the amount of data to be imported by a station installation designing device per one instance of station installation designing is reduced.

Thus, it is possible to reduce the number of computational resources required per one instance of station installation designing. However, on the other hand, since station installation designing is performed independently and in parallel for the divisional areas, cells respectively formed by base stations installed in different areas may overlap each other at the boundaries of the divided areas. Therefore, there is a problem in that areas are inefficiently covered by the base stations.

Figure 4:
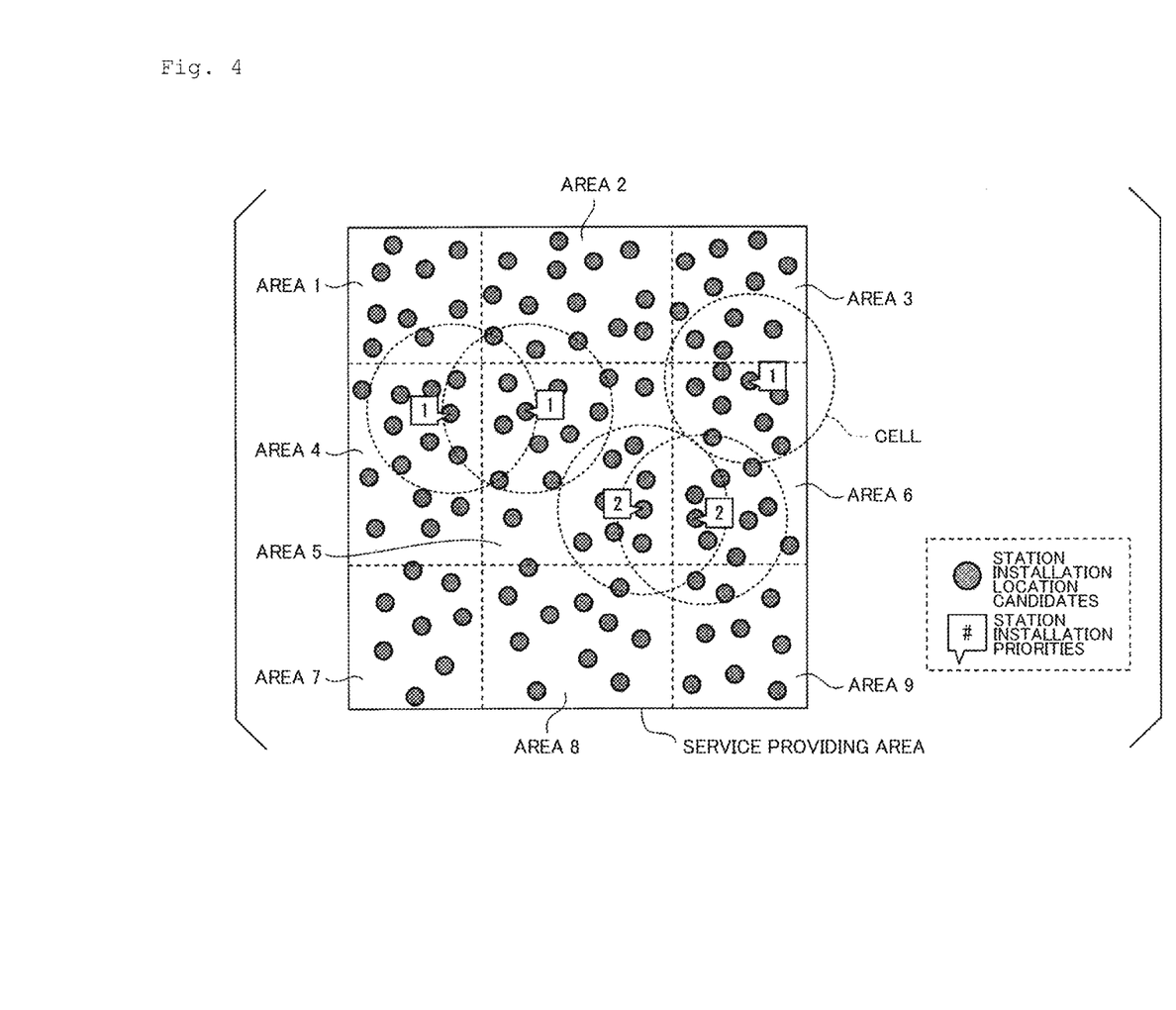
FIG. 4 is a diagram illustrating a problem in a case where station installation designing is performed in parallel for a plurality of divisional areas.

FIG. 4 is a diagram illustrating the above-described problem in a case where station installation designing is performed in parallel for a plurality of divisional areas. The following describes a case in which, as shown in FIG. 4, service providing area is divided into nine areas and station installation designing is performed therefor, for example. In FIG. 4, the rectangle that indicates the outer contour represents the entire range of the service providing area. The service providing area is divided into nine areas in a mesh pattern. As shown in FIG. 4, the nine areas are respectively given identification numbers from area 1 to area 9.

Also, in FIG. 4, the circles drawn in dotted lines represent cells formed by the base stations, in which station installation priorities are respectively indicated. The circles drawn in solid lines represent station installation location candidates. The number shown in each balloon represents the station installation priority given to the station installation location candidate pointed to by the balloon.

Here, for example, it is envisaged that station installation designing has been performed to select station installation location candidates for the areas 4, 5, and 6, respectively. Note that station installation designing is to be performed so as to satisfy the optimization conditions such as the condition that the number of base stations is minimized. It is also envisaged that station installation priorities have been determined as shown in FIG. 4 as a result of station installation designing. Note that, in FIG. 4, the first priority is shown in the area 4, and priority levels up to the second priority are shown in the areas 5 and 6, regarding the station installation priorities.

As described above, the station installation priorities are determined for each divisional area so that an optimization condition can be satisfied in the area. Therefore, as shown in FIG. 4, when attention is only paid to the area 5, as a result of base stations being installed in the station installation location candidate that is given the first station installation priority and the station installation location candidate that is given the second station installation priority, the overlapping area of the cells respectively formed by the two base stations is small. Thus, it can be seen that the regions in the areas are efficiently covered.

On the other hand, when attention is paid to both the area 4 and the area 5, if base stations are respectively installed in the station installation location candidates that are given the first station installation priority in the areas, the two base stations will be adjacent to each other as shown in FIG. 4. Therefore, the overlapping area of the cells formed by the two base stations is large, and areas will be inefficiently covered by the base stations.

Similarly, when attention is paid to both the area 5 and the area 6, if base stations are respectively installed in the station installation location candidates that are given the first station installation priority in the areas, the two base stations will not be adjacent to each other as shown in FIG. 4, and the cells formed by the two base stations will not overlap each other. However, if base stations are respectively installed in the station installation location candidates that are given the second station installation priority in the areas, the two base stations will be adjacent to each other as shown in FIG. 4. Therefore, the overlapping area of the cells formed by the two base stations is large, and areas are inefficiently covered by the base stations.

As described above, with the conventional techniques, cells formed by the base stations installed in the two areas may overlap each other at the boundaries of the divisional areas. Thus, there is a problem in that areas are inefficiently covered by the base stations.

The present invention has been made in view of the above-described situation, and aims to provide a technique for selecting a station installation location for abase station, which makes it possible to efficiently cover areas.

Means for Solving the Problem

One aspect of the present invention is a station installation designing assistance device that divides a service providing area into a plurality of areas, and performs station installation designing for the plurality of areas in parallel, the station installation designing assistance device including: an area dividing unit that divides an entirety of the service providing area into a plurality of areas that are each composed of a predetermined number of small areas; a small area specifying unit that specifies a small area number that identifies a small area in each of the areas, where the same number is given to the small area in each of the areas; and a station installation location selecting unit that selects, for each of the plurality of areas, a plurality of station installation locations from among station installation location candidates that are present in the small area specified by the small area specifying unit.

Effects of the Invention

According to the present invention, it is possible to select station installation locations for base stations so that the base stations can efficiently cover areas.

DESCRIPTION OF EMBODIMENTS

The following describes an embodiment of the present invention with reference to the drawings.

[Functional Configuration of Station Installation Designing Assistance Device]

Figure 1:
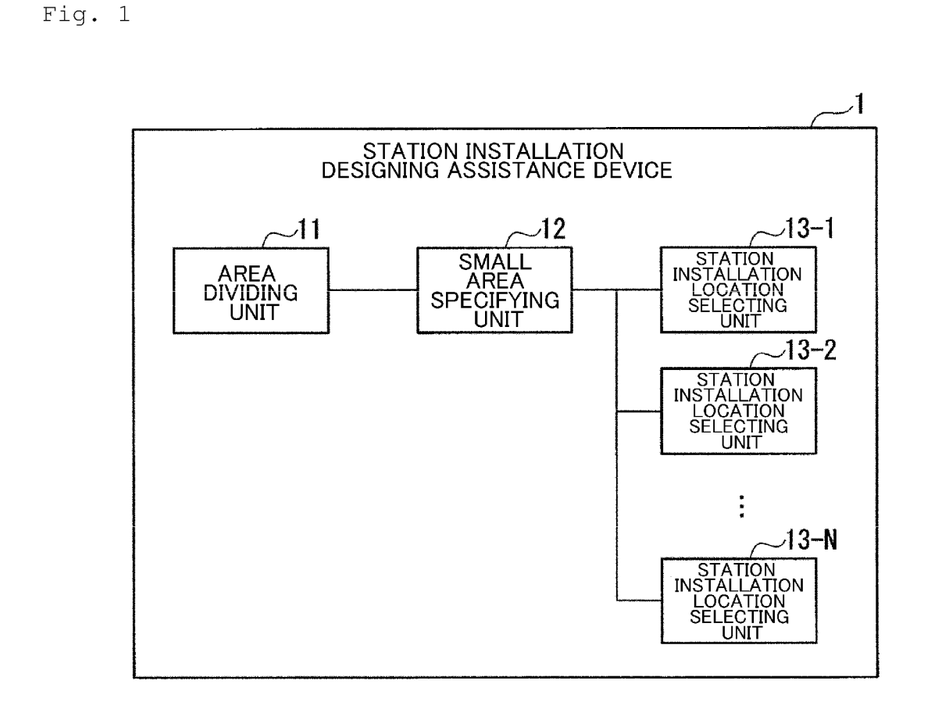
FIG. 1 is a block diagram showing a functional configuration of a station installation designing assistance device 1 according to an embodiment of the present invention.

FIG. 1 is a block diagram showing a functional configuration of the station installation designing assistance device 1 according to an embodiment of the present invention. As shown in FIG. 1, the station installation designing assistance device 1 includes an area dividing unit 11, a small area specifying unit 12, and station installation location selecting units 13-1 to 13-N.

The area dividing unit 11 acquires various kinds of data regarding the entire service providing area that is the subject of station installation designing. Note that the area dividing unit 11 may be configured to acquire the data from an external device or the like, or configured to acquire the data that has been stored in advance in a recording medium (not shown) provided in the station installation designing assistance device 1 thereof.

The area dividing unit 11 divides the entire service providing area that is the subject of station installation designing into N areas, and also divides the entire service providing area that is the subject of station installation designing into 3×N honeycomb-shaped (regular hexagonal) small areas. That is to say, in the present embodiment, one area is formed from three small areas, and N areas (areas 1 to N) that each have three small areas are formed.

In each of the areas, the three small areas included therein are respectively given small area numbers such as "small area 1", "small area 2", and "small area 3". Note that specification of the number of areas (the value of N), allocation of area numbers that identify divisional areas, and allocation of small area numbers that identify small areas are performed by a user or the like that performs station installation designing, for example.

The area dividing unit 11 outputs information regarding divisional areas and small areas to the small area specifying unit 12.

The small area specifying unit 12 acquires the information regarding divisional areas and small areas output from the area dividing unit 11. The small area specifying unit 12 selects a small area number corresponding to the small area that is the subject of the station installation designing, from among "small area 1", "small area 2", and "small area 3" defined by the area dividing unit 11.

Also, the small area specifying unit 12 allocates the N areas divided by the area dividing unit 11 to the station installation location selecting units 13-1 to 13-N. The small area specifying unit 12 outputs pieces of information indicating the area numbers corresponding to the allocated areas to the station installation location selecting units 13-1 to 13-N, respectively. The small area specifying unit 12 also outputs pieces of information regarding the small areas and pieces of information indicating the selected small area numbers to the station installation location selecting units 13-1 to 13-N, respectively.

The station installation location selecting units 13-1 to 13-N acquire the pieces of information indicating the area numbers corresponding to the allocated area, the pieces of information regarding the small areas, and the pieces of information indicating the selected small area numbers, output from the small area specifying unit 12, respectively.

The station installation location selecting units 13-1 to 13-N acquire various kinds of data regarding the areas corresponding to the acquired area numbers. Note that the station installation location selecting units 13-1 to 13-N may be configured to acquire the data from an external device or the like, or configured to acquire the data that has been stored in advance in a recording medium (not shown) provided in the station installation designing assistance device 1 thereof. Alternatively, the station installation location selecting units 13-1 to 13-N may be configured to acquire the data via the area dividing unit 11 and the small area specifying unit 12.

Regarding the areas corresponding to the acquired area numbers, based on the various kinds of data thus acquired, the station installation location selecting units 13-1 to 13-N select, from among the station installation location candidates that are present in the small areas corresponding to the acquired small area numbers, a plurality of station installation locations that are suitable for efficiently covering the small areas. Note that the number of stations to be installed required to cover the entire small area varies depending on the area of the small area, the area of the cell per one base station, a method for selecting station installation locations, and so on.

[Operations in Order of Station Installation Priorities]

The following describes examples of operations of the station installation designing assistance device 1.

Figure 2:
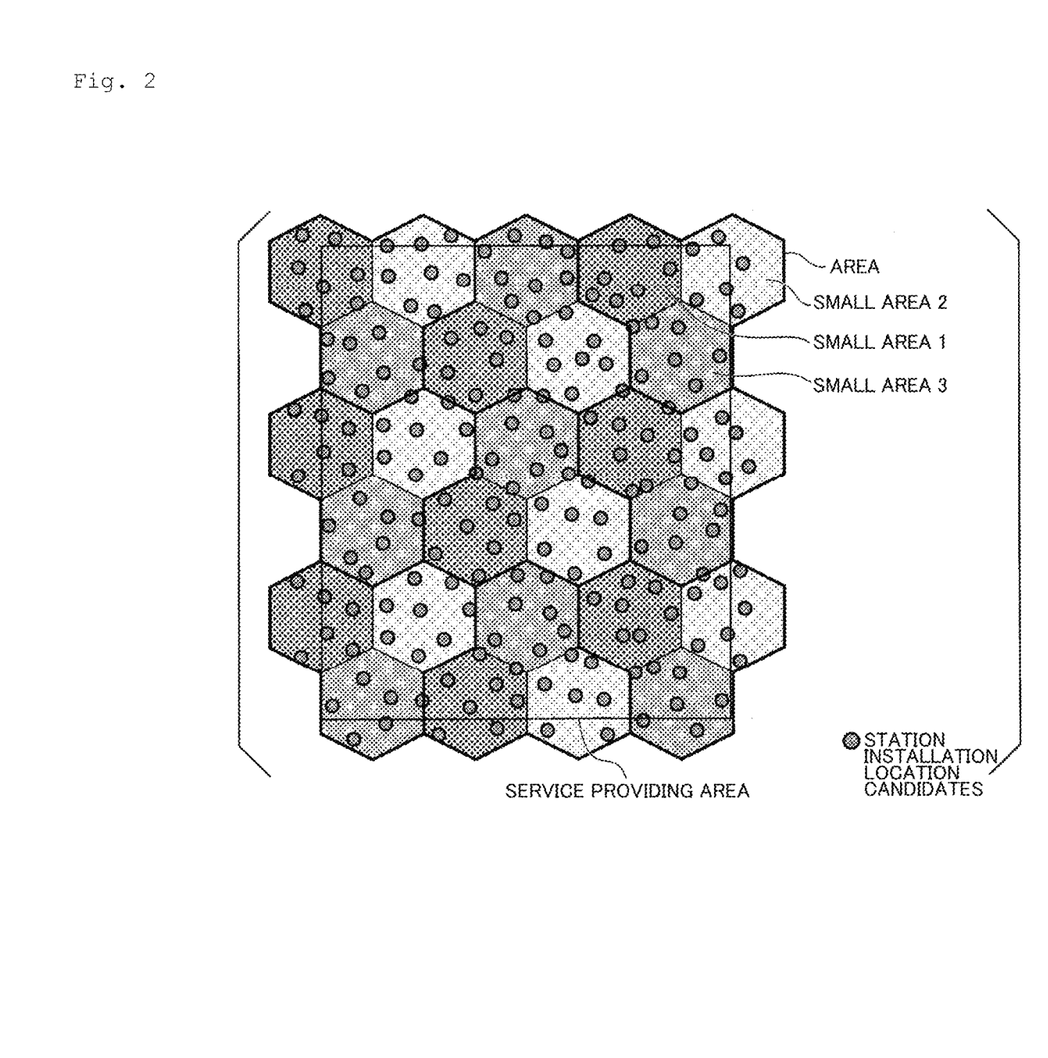
FIG. 2 is a diagram illustrating operations of the station installation designing assistance device 1 according to an embodiment of the present invention.

FIG. 2 is a diagram illustrating operations of the station installation designing assistance device 1 according to an embodiment of the present invention.

As shown in FIG. 2, in one example, the service providing area that is the subject of station installation designing is to be divided into nine (N=9) areas. In FIG. 2, each of the regions surrounded by the bold line is an area. Each area is composed of three honeycomb-shaped small areas.

The area dividing unit 11 divides the entire service providing area that is the subject of station installation designing, into 3×9 honeycomb-shaped small areas. Thereafter, the area dividing unit 11 gives small area numbers to the small areas such that the small area numbers ("small area 1", "small area 2", and "small area 3") given to the small areas are not the same as the small area numbers given to other adjacent small areas. In this way, in the present embodiment, the entire service providing area that is the subject of station installation designing is divided into nine areas, and each divisional area is composed of three small areas.

The small area specifying unit 12 first specifies, for example, "small area 1" as the small area number of the small area that is to be the subject of station installation designing.

Each of the station installation location selecting units 13-1 to 13-9 performs station installation designing on the small area to which the small area number specified by the small area specifying unit 12 (i.e., "small area 1") has been given, in the area assigned thereto by the small area specifying unit 12. Each of the station installation location selecting units 13-1 to 13-9 selects a plurality of station installation locations from among the station installation location candidates that are present in the small area that is the subject of station installation designing. Here, each of the station installation location selecting units 13-1 to 13-9 selects a plurality of station installation locations that are suitable for efficiently covering the entire small area that is the subject of station installation.

Next, the small area specifying unit 12 specifies, for example, "small area 2" as the small area number of the small area that is to be the subject of station installation designing.

Each of the station installation location selecting units 13-1 to 13-9 performs station installation designing on the small area to which the small area number specified by the small area specifying unit 12 (i.e., "small area 2") has been given, in the area assigned thereto by the small area specifying unit 12. Each of the station installation location selecting units 13-1 to 13-9 selects a plurality of station installation locations from among the station installation location candidates that are present in the small area that is the subject of station installation designing. Here, each of the station installation location selecting units 13-1 to 13-9 selects a plurality of station installation locations that are suitable for efficiently covering the entire small area that is the subject of station installation.

At this time, each of the station installation location selecting units 13-1 to 13-9 selects station installation locations for the small area to which the area number "small area 2" has been given, in a state where the results of the station installation designing performed on the small area to which the above-described area number "small area 1" has been given are reflected. That is to say, each of the station installation location selecting units 13-1 to 13-9 selects station installation locations for the small area to which the area number "small area 2" has been given, assuming that a base station has been installed in the station installation location selected through station installation designing performed on the small area to which the area number "small area 1" has been given.

Next, the small area specifying unit 12 specifies, for example, "small area 3" as the small area number of the small area that is to be the subject of station installation designing.

Each of the station installation location selecting units 13-1 to 13-9 performs station installation designing on the small area to which the small area number specified by the small area specifying unit 12 (i.e., "small area 3") has been given, in the area assigned thereto by the small area specifying unit 12. Each of the station installation location selecting units 13-1 to 13-9 selects a plurality of station installation locations from among the station installation location candidates that are present in the small area that is the subject of station installation designing. Here, each of the station installation location selecting units 13-1 to 13-9 selects a plurality of station installation locations that are suitable for efficiently covering the entire small area that is the subject of station installation.

At this time, each of the station installation location selecting units 13-1 to 13-9 selects station installation locations for the small area to which the area number "small area 3" has been given, in a state where the results of the station installation designing performed on the small area to which the above-described area number "small area 1" has been given, and the results of the station installation designing performed on the small area to which the above-described area number "small area 2" has been given, are reflected. That is to say, each of the station installation location selecting units 13-1 to 13-9 selects station installation locations for the small area to which the area number "small area 3" has been given, assuming that a base station has been installed in the station installation location selected through station installation designing performed on the small area to which the area number "small area 1" has been given, and a base station has been installed in the station installation location selected through station installation designing performed on the small area to which the area number "small area 2" has been given.

Note that, in the present embodiment, when a plurality of station installation locations are to be selected from among station installation location candidates that are present in the small area, station installation designing is performed after importing various kinds of data regarding a region that has been expanded (in the north, south, east, and west, for example) so as to include the small area that is the subject of station installation designing, in order to ensure the accuracy of station installation designing at the ends of the small area.

The above-described region that has been expanded so as to include the small area that is the subject of station installation designing may be, for example, a region that is composed of seven small areas in total including six small areas that are adjacent to the small area in addition to the small area that is the subject of station installation designing.

As described above, in the present embodiment, the entire service providing area that is the subject of station installation designing is divided into honeycomb-shaped small areas. Thereafter, when station installation designing is to be performed for the small area to which the small area number "small area 1" has been given, for example, various kinds of data regarding the six small areas that are adjacent to the small area to which the small area number "small area 1" has been given are imported in addition to various kinds of data regarding the small area to which the small area number "small area 1" has been given. Here, all of the adjacent six small areas are small areas to each which the small area number "small area 2" or "small area 3" has been given.

Therefore, even if station installation designing is performed in parallel (at the same time) for the small areas to which the small area number "small area 1" has been given in each of the nine areas, station installation designing for one small area does not affect that for another small area. That is to say, the station installation location selected through station installation designing performed for the small area to which a small area number "small area 1" has been given in one area will not be affected by the result of station installation designing performed for the small area to which a small area number "small area 1" has been given in any of the other areas. This is because, as described above, the adjacent six small areas do not include the small area that has been given the small area number "small area 1" and is the subject of station installation designing.

With the above-described configuration, the station installation designing assistance device 1 according to the present embodiment can prevent station installation designing from being performed in parallel (at the same time) at the respective boundary portions of areas that are adjacent to each other.

Although the number of small areas that constitute one area is three in the present embodiment, the present invention is not limited in this way. The number of small areas that constitute one area may be any number as long as it is possible to prevent the small area numbers of small areas that are adjacent to each other from being the same small area numbers. For example, even if the number of small areas that constitute one area is four or seven, it is possible to prevent the small area numbers of small areas that are adjacent to each other from being the same small area numbers.

Although the entire service providing area that is the subject of station installation designing is divided into honeycomb-shaped (regular hexagonal) small areas in the present embodiment, the present invention is not limited in this way. For example, the entire service providing area that is the subject of station installation designing may be divided into regular triangle or regular quadrangle small areas, for example.

Figure 3:
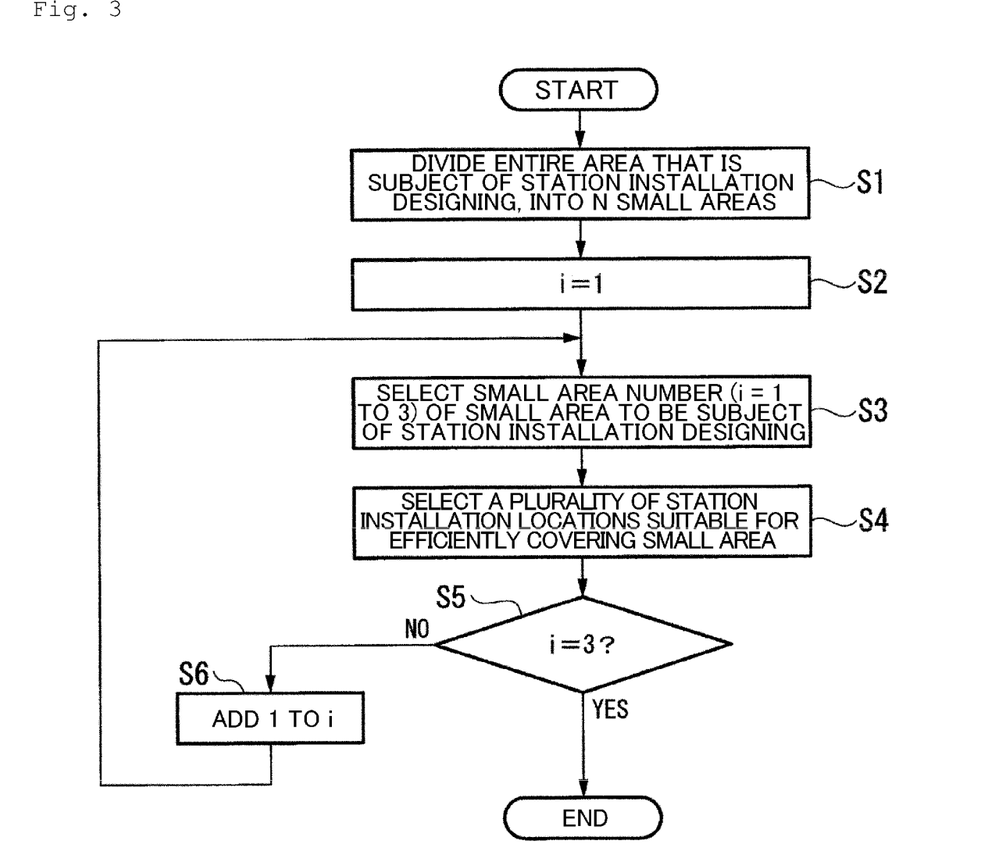
FIG. 3 is a flowchart showing operations of the station installation designing assistance device 1 according to an embodiment of the present invention.

FIG. 3 is a flowchart showing operations of the station installation designing assistance device 1 according to an embodiment of the present invention.

The area dividing unit 11 divides the entire service providing area that is the subject of station installation designing into N areas, and also divides the entire service providing area that is the subject of station installation designing into 3×N honeycomb-shaped small areas. That is to say, one area is formed from three small areas, and N areas (areas 1 to N) that each have three small areas are formed (step S1).

1 is substituted into a variable i that represents the small area number (small area i) (step S2). Note that the value of the variable i is temporarily stored in a storage medium (not shown) provided in the station installation designing assistance device 1, for example, by a control unit (not shown) provided in the station installation designing assistance device 1, for example.

Note that the control unit includes a processor such as a CPU (Central Processing Unit). The storage medium is formed using a RAM (Random Access Memory), a flash memory, an EEPROM (Electrically Erasable Programmable Read Only Memory), an HDD (Hard Disk Drive), or the like, or a combination of such storage media, for example.

The small area specifying unit 12 selects one small area number corresponding to the small area that is to be the subject of station installation designing, from among the small area numbers (i=1 to 3) defined by the area dividing unit 11 (step S3).

Regarding the N areas divided by the area dividing unit 11, the station installation location selecting units 13-1 to 13-N each select, from among the station installation location candidates that are present in the small area to which the small area number (i=1 to 3) specified by the small area specifying unit 12 has been given, a plurality of station installation locations that are suitable for efficiently covering the small area (step S4).

Determination is performed regarding whether or not the value of the variable i is equal to "3" that is the total number of small areas (step S5). If the value of the variable i is not equal to "3" (No in step S5), 1 is added to the value of the variable i (step S6), and processing proceeds to step S3. Note that the determination processing regarding the comparison with the value of the variable i and the addition processing for addition to the value of the variable i described above are performed by the control unit (not shown) provided in the station installation designing assistance device 1, for example.

On the other hand, if the value of the variable i is equal to "3" (Yes in step S5), the selection of station installation locations is complete for every small area, and the operations of the station installation designing assistance device 1 shown in the flowchart in FIG. 3 end.

In the present embodiment, regarding the small area to which the small area number specified by the small area specifying unit 12 has been given, the station installation location selecting units 13-1 to 13-N each select a plurality of station installation locations that are suitable for efficiently cover the entire small area by performing one instance of processing. However, the present invention is not limited in this way. For example, the station installation location selecting units 13-1 to 13-N may each select one station installation location that is most suitable in the small area through one instance of processing, and thereafter proceed to perform processing to select a station installation location in the next small area.

That is to say, if one area is composed of three small areas, the following processing is to be performed. For each of the areas, first, one station installation location that is most suitable is selected from among station installation location candidates that are present in the small area to which the area number "small area 1" has been given.

Thereafter, in a state where the results of the selection are reflected (i.e., on the assumption that the base station is installed in the station installation location selected in each small area to which the small area number "small area 1" has been given), one station installation location that is most suitable is selected from among station installation location candidates that are present in the small area to which the area number "small area 2" has been given, for each small area.

Thereafter, in a state where the results of the selection are reflected (i.e., on the assumption that the base station is installed in the station installation location selected in each small area to which the small area number "small area 1" has been given and each small area to which the small area number "small area 2" has been given), one station installation location that is most suitable is selected from among station installation location candidates that are present in the small area to which the area number "small area 3" has been given, for each small area.

Thereafter, in a state where the results of the selection are reflected (i.e., on the assumption that the base station is installed in the station installation location selected in each small area to which the small area number "small area 1" has been given, each small area to which the small area number "small area 2" has been given, and each small area to which the small area number "small area 3" has been given), one station installation location is selected again from among station installation location candidates that are present in the small area to which the area number "small area 1" has been given, for each small area. Thereafter, station installation locations, namely small areas 2, small areas 3, small areas 1, and so on, are sequentially selected in the same manner.

In such an order of processing, regarding the small areas to which small area numbers specified by the small area specifying unit 12 have been given, the station installation location selecting units 13-1 to 13-N may each select a plurality of station installation locations that are suitable for efficiently covering the entire small area corresponding thereto.

As described above, the station installation designing assistance device 1 according to an embodiment of the present invention divides a service providing area into a plurality of areas, and perform station installation designing for the plurality of areas in parallel. The station installation designing assistance device 1 includes: an area dividing unit 11 that divides an entirety of the service providing area into a plurality of areas that are each composed of a predetermined number of small areas; a small area specifying unit 12 that specifies a small area number that identifies a small area in each of the areas, where the same number is given to the small area in each of the areas; and station installation location selecting units 13-1 to 13-N that each select, for an area corresponding thereto of the plurality of areas, a plurality of station installation locations from among station installation location candidates that are present in the small area specified by the small area specifying unit 12.

With the above-described configuration, when dividing the service providing area of a communication service provided by a wireless communication system and performs station installation designing for the plurality of divisional areas in parallel, the station installation designing assistance device 1 according to an embodiment of the present invention further divides each of the plurality of areas into a predetermined number of small areas. The station installation designing assistance device 1 specifies, respectively for all of the areas, small areas that have been given the same small area number and are not adjacent to each other, at the same time. Regarding the specified small area, the station installation designing assistance device 1 performs processing to select a station installation location of a base station that efficiently covers the entire small area, on the assumption that base stations have been installed in the station installation locations selected through station installation designing performed for the small areas that have been previously specified, for all of the areas in parallel.

As a result, the station installation designing assistance device 1 according to an embodiment of the present invention can efficiently determine the station installation locations while preventing cells formed by base stations respectively installed in areas that are adjacent to each other from overlapping each other.

As described above, the station installation designing assistance device 1 according to an embodiment of the present invention performs station installation designing for small areas that have been given the same small area number, for the areas in parallel, and can thus prevent station installation designing from being performed in parallel (at the same time) at the respective boundary portions of the two areas that are adjacent to each other. Thus, the station installation designing assistance device 1 can reduce inefficiency by performing station installation designing for divisional areas, and select station installation locations for base stations so that the base stations can efficiently cover areas.

The station installation designing assistance device 1 in the above-described embodiment can be realized using a computer and a program. In such a case, the program may be recorded on a recording medium, or provided via a network.

The station installation designing assistance device 1 in the above-described embodiment may be realized using a computer. In such a case, the station installation designing assistance device 1 may be realized by recording a program for realizing the functions thereof on a computer-readable recording medium, and causing a computer system to read and execute the program recorded on the recording medium. Note that the "computer system" mentioned here may include hardware such as an OS and peripheral devices. The "computer-readable recording medium" may be a portable medium such as a flexible disk, a magneto-optical disk, a ROM, or a CD-ROM, or a storage device built in the computer system, such as a hard disk. Furthermore, the "computer-readable recording medium" may be a recording medium such as a communication line that dynamically holds a program for a short period of time when a program is transmitted via a network such as the Internet or a communication line such as a telephone line, or a recording medium that holds a program for a certain period of time, such as volatile memory in a computer system that serves as a server or client in such a case. Also, the above-described program may be a program for realizing some of the aforementioned functions, or a program that can realize the aforementioned functions in combination with a program that has already been recorded on the computer system, or a program that is realized using a programable logic device such as an FPGA (Field Programmable Gate Array).

Although an embodiment of the present invention has been described above with reference to the drawings, it is clear that the above embodiment is merely an example of the present invention, and the present invention is not limited to the above embodiment. Therefore, it is possible to add, omit, replace, or apply another modification to the constituent elements without departing from the technical idea and the spirit of the present invention.

REFERENCE SIGNS LIST

1 Station installation designing assistance device
11 Area dividing unit
12 Small area specifying unit
13-1 to 13-N Station installation location selecting unit

The invention claimed is:

1. A station installation designing assistance device that divides a service providing area into a plurality of areas, and performs station installation designing for the plurality of areas in parallel, the station installation designing assistance device comprising:
a processor; and
a non-transitory storage medium having computer program instructions stored thereon, when executed by the processor, perform to:
divide an entirety of the service providing area into a plurality of areas, each area in the plurality of areas is further divided into a predetermined number of honeycomb-shaped small areas that are each composed of a predetermined number of small areas;
assign a small area number that identifies a small area to each of the small areas in each of the plurality of areas, where same number is given to small areas having corresponding spatial locations in each of the plurality of areas in each of the areas;
select an assigned small area number; and
for each small area in the plurality of areas that corresponds to the selected small area number, concurrently select a plurality of the station installation locations from among the station installation location candidates that are present in the small area, where selecting the plurality of station installation locations minimizes the number of station installation locations.

2. The station installation designing assistance device according to claim 1, wherein the computer program instructions further perform to
divide the entirety of the service providing area into a plurality of areas that are each composed of three small areas.

3. The station installation designing assistance device according to claim 1, wherein selecting the plurality of station installation locations includes determining the plurality of station installation locations based on one or more of a desired wave reception power, an interference signal power, and a local traffic pattern.

4. A station installation designing assistance method for dividing a service providing area into a plurality of areas, and performing station installation designing for the plurality of areas in parallel, the station installation designing assistance method comprising:
dividing an entirety of the service providing area into a plurality of areas, each area in the plurality of areas is further divided into a predetermined number of honeycomb-shaped small areas;
assigning a small area number that identifies a small area to each of the small areas in each of the plurality of areas, where same number is given to small areas having corresponding spatial locations in each of the plurality of areas;
selecting an assigned small area number; and
for each small area in the plurality of areas that corresponds to the selected small area number, concurrently select a plurality of the station installation locations from among the station installation location candidates that are present in the small area, where selecting the plurality of station installation locations minimizes the number of station installation locations.

* * * * *